United States Patent
Torres et al.

(10) Patent No.: US 12,236,344 B2
(45) Date of Patent: *Feb. 25, 2025

(54) SYSTEM AND METHOD FOR PERFORMING COLLABORATIVE LEARNING OF MACHINE REPRESENTATIONS FOR A TARGET CONCEPT

(71) Applicant: Palo Alto Research Center Incorporated, Palo Alto, CA (US)

(72) Inventors: Francisco E. Torres, San Jose, CA (US); Hoda M. A. Eldardiry, Blacksburg, VA (US)

(73) Assignee: Xerox Corporation, Norwalk, CT (US)

( * ) Notice: Subject to any disclaimer, the term of this patent is extended or adjusted under 35 U.S.C. 154(b) by 1014 days.

This patent is subject to a terminal disclaimer.

(21) Appl. No.: 17/207,385

(22) Filed: Mar. 19, 2021

(65) Prior Publication Data

US 2022/0300802 A1    Sep. 22, 2022

(51) Int. Cl.
G06N 3/08    (2023.01)
G06N 3/04    (2023.01)

(52) U.S. Cl.
CPC ............ *G06N 3/08* (2013.01); *G06N 3/04* (2013.01)

(58) Field of Classification Search
CPC ............ G06N 3/08; G06N 3/04; G06N 3/045
See application file for complete search history.

(56) References Cited

U.S. PATENT DOCUMENTS

| | | | |
|---|---|---|---|
| 8,156,063 B1 * | 4/2012 | Rahmouni | G06Q 10/06375 706/62 |
| 10,147,023 B1 | 12/2018 | Klaudiny | |
| 10,229,539 B2 | 3/2019 | Shikoda | |
| 10,304,159 B2 | 5/2019 | Aoyagi | |
| 10,366,521 B1 | 7/2019 | Peacock | |
| 10,430,517 B1 * | 10/2019 | Mulwad | G06F 11/0793 |
| 11,256,958 B1 | 2/2022 | Subbiah | |

(Continued)

OTHER PUBLICATIONS

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* * Section IV* * Figure 6*.

(Continued)

*Primary Examiner* — Hien L Duong (57) ABSTRACT

Embodiments provide a system and method for performing collaborative learning of machine representations of a concept. During operation, the system can receive a user-specified object associated with a user's concept of interest. The system can compute a similarity score between a target feature vector associated with the user-specified object and a respective feature vector for a set of candidate objects. The system can determine, based on the similarity score, a first subset of candidate objects that satisfy a similarity threshold. The system can receive, via a GUI, a first user-feedback associated with a visual representation of the first subset of candidate objects. The first user-feedback can represent an elaboration of a current user's concept of interest. The system can then modify, based on the first user-feedback, the target feature vector and the similarity function, thereby providing an improved model for machine representations of a current user's concept of interest.

20 Claims, 7 Drawing Sheets

(56) References Cited

U.S. PATENT DOCUMENTS

| | | | |
|---|---|---|---|
| 2004/0181527 A1* | 9/2004 | Burdick | G06F 16/285 |
| 2008/0189083 A1 | 8/2008 | Schell | |
| 2010/0040272 A1 | 2/2010 | Zheng | |
| 2012/0200601 A1 | 8/2012 | Osterhout | |
| 2013/0127980 A1 | 5/2013 | Haddick | |
| 2013/0173583 A1* | 7/2013 | Hueter | G06F 16/41 |
| | | | 707/711 |
| 2014/0328512 A1* | 11/2014 | Gurwicz | G06V 20/52 |
| | | | 382/103 |
| 2015/0037775 A1 | 2/2015 | Ottensmeyer | |
| 2016/0260261 A1 | 9/2016 | Hsu | |
| 2016/0292925 A1 | 10/2016 | Montgomerie | |
| 2016/0328887 A1 | 11/2016 | Elvezio | |
| 2016/0335578 A1 | 11/2016 | Sagawa | |
| 2016/0349511 A1 | 12/2016 | Meiron | |
| 2017/0018076 A1* | 1/2017 | Middlebrooks | G06F 18/217 |
| 2017/0366805 A1 | 12/2017 | Sevostianov | |
| 2018/0035606 A1 | 2/2018 | Burdoucci | |
| 2018/0082110 A1* | 3/2018 | Myers | G06V 40/173 |
| 2018/0089531 A1* | 3/2018 | Geva | G06V 10/454 |
| 2018/0157916 A1* | 6/2018 | Doumbouya | G06V 40/103 |
| 2018/0173696 A1* | 6/2018 | Hosabettu | G06F 16/36 |
| 2018/0204160 A1 | 7/2018 | Chehade | |
| 2018/0315329 A1 | 11/2018 | D'Amato | |
| 2018/0336732 A1 | 11/2018 | Schuster | |
| 2019/0156202 A1 | 5/2019 | Falk | |
| 2019/0362269 A1* | 11/2019 | Barad | G06F 21/55 |
| 2019/0362556 A1 | 11/2019 | Ben-Dor | |
| 2020/0081249 A1 | 3/2020 | Brusnitsyn | |
| 2020/0151860 A1* | 5/2020 | Safdarnejad | G06T 7/162 |
| 2020/0210780 A1* | 7/2020 | Torres | G06F 18/2178 |
| 2020/0327197 A1* | 10/2020 | Bhowal | G06N 5/041 |
| 2021/0090289 A1* | 3/2021 | Karanam | G06T 7/337 |
| 2021/0133434 A1* | 5/2021 | Chen | G06N 3/08 |
| 2021/0158086 A1* | 5/2021 | Salamon | G10L 25/51 |
| 2021/0243362 A1 | 8/2021 | Castillo | |
| 2021/0294840 A1* | 9/2021 | Lee | G06N 3/084 |
| 2021/0350588 A1 | 11/2021 | Tanida | |
| 2021/0357282 A1* | 11/2021 | Verma | G06N 3/044 |
| 2021/0374547 A1* | 12/2021 | Wang | G06N 3/047 |
| 2022/0036008 A1* | 2/2022 | Cleverley | G06N 20/00 |
| 2022/0277431 A1* | 9/2022 | Tensmeyer | G06N 3/088 |
| 2023/0070439 A1* | 3/2023 | Gupta | G06V 10/82 |
| 2023/0237769 A1* | 7/2023 | Li | G06V 10/763 |
| | | | 382/159 |

OTHER PUBLICATIONS

Georgios Georgakis et al., "Multiview RGB-D Dataset for Object Instance Detection", 2016 Fourth International Conference on 3D Vision (3DV), Sep. 26, 2016, pp. 426-434. *Abstract* * Section 3*.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. *abstract* *Section III*.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/pdf/1707.04796.pdf. *abstract* *Section 111*.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "PoseTrack: Joint Multi-Person Pose Estimation and Tracking", arXiv:1611.07727v3 [ cs.CV] Apr. 7, 2017.

Ohan Oda, etal.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How to Get Phone Notifications When Your Brother HL-3170CDW Printer Runs Out of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/ p-strong-epson-printer-says-out-of-paper-but-it-isnt-strong-p-p-p (Year: 2018).

Adepu et al. Control Behavior Integrity for Distributed Cyber-Physical Systems (Year: 2018).

J. L. Pech-Pacheco et al "Diatom autofocusing in brightheld microscopy: a comparative study" IEEE 2000.

Said Pertuz et al "Analysis of focus measure operators in shape-from-focus", Research gate Nov. 2012, Article, Accepted Nov. 7, 2012, Available priline Nov. 16, 2012.

Khurram Soomro "UCF 101: A Dataset of 101 Human Actions Classes From Videos in the Wild" Dec. 2012.

* cited by examiner

SYSTEM AND METHOD FOR PERFORMING COLLABORATIVE LEARNING OF MACHINE REPRESENTATIONS FOR A TARGET CONCEPT

STATEMENT OF GOVERNMENT-FUNDED RESEARCH

This invention was made with U.S. government support under (Contract Number) Award Number: DTFH6115H00006 awarded by the Department of Transportation Federal Highway Safety Administration. The U.S. government has certain rights in the invention.

RELATED APPLICATIONS

This application is related to U.S. patent application Ser. No. 16/235,743, entitled "Agile Video Query Using Ensembles of Deep Neural Networks," by inventors Francisco E. Torres, Hoda Eldardiry, Matthew Shreve, Gaurang Gaval, and Chad Ramos, filed 28 Dec. 2018 (hereinafter "U.S. patent application Ser. No. 16/235,743"), the disclosure of which is herein incorporated by reference in their entirety.

BACKGROUND

Field

This disclosure is generally related to machine learning. More specifically, this disclosure is related to a system and method for performing collaborative learning of machine representations for a target concept.

Related Art

Applications of machine learning techniques have rapidly gained popularity in different fields, e.g., object detection, pattern recognition, etc. Machine learning approaches may compute machine representations for some concepts using different techniques. In general, machine learning approaches can be classified into supervised and unsupervised learning techniques. Supervised machine learning techniques require a specification upfront and a sufficient amount of labeled data. For this approach, the specification can be a human-understandable representation, and the supervised machine learning technique can accept samples labeled according to the specification without questioning or probing whether the specification makes sense and whether it can accomplish what the user wants it to accomplish. In other words, such supervised machine learning techniques do not learn machine representations by collaboratively building a better understanding of a target concept.

Unsupervised machine learning techniques do not require labeled data, but instead they can learn to sort data into clusters based on correlations in the unlabeled data. Each cluster has some learned machine representations in common. Given such an unsupervised learning model, the cluster for each example can be computed. However, there is no guarantee that the examples the user considers to be of the same concept may belong to the same cluster. Therefore, some challenges still remain in current machine learning techniques.

SUMMARY

The embodiments described herein provide a system and method for performing collaborative learning of machine representations for a target concept exemplified by unstructured data while evolving an understanding of the target concept at the same time. During operation, the system can receive a user-specified object associated with a user's concept of interest. The system can compute, based on a similarity function, a similarity score between a target feature vector associated with the user-specified object and a respective feature vector for a set of candidate objects. The system can then determine, based on the similarity score, a first subset of candidate objects that satisfy a similarity threshold within a specified tolerance. The system can present, via a graphical user interface (GUI), a visual representation of the first subset of candidate objects. The system can receive a user feedback corresponding to the visual representation of the first subset of candidate objects. The first user-feedback can represent an elaboration of a current user's concept of interest. The system can then modify, based on the first user-feedback, the target feature vector and the similarity function, thereby providing an improved model for machine representations of the current user's concept of interest.

In a variation of this embodiment, the user-specified object can represent one or more of: a video clip, an image, text, and other types of objects for which deep neural network embedded features exist.

In a variation on this embodiment, the first user-feedback can include: a selection of one or more non-matching candidate objects in the first subset of candidate objects; and a de-selection of one or more matching candidate objects in the first subset of candidate objects.

In a further variation on this embodiment, the system can iteratively perform the following operations until a user request to terminate searching for matching candidate objects is received: computing, based on the modified similarity function and the modified target feature vector, an updated similarity score between the modified target feature vector and a respective feature vector for the set of candidate objects; determining, based on the updated similarity score, a second subset of candidate objects that satisfy an updated similarity threshold within the specified tolerance; receiving a second user-feedback corresponding to a visual representation of the second subset of candidate objects, wherein the second user feedback indicates a current user's concept of interest; and modifying, based on the second user-feedback, the modified target feature vector and the modified similarity function, thereby further improving the model for machine representations of the current user's concept of interest, in collaboration with the user.

In a variation on this embodiment, the system can compute, based on the similarity function, the similarity score between the target feature vector associated with the user-specified object and the respective feature vector for the set of candidate objects by computing, based on multiple types of deep neural networks (DNN) associated with each candidate object and user-specified object, a weighted ensemble average of similarities. Each type of DNN is associated with a different weight, wherein a respective weight is updated based on a user feedback.

In a further variation on this embodiment, the system can compute, based on the similarity function, the similarity score between the target feature vector associated with the user-specified object and the respective feature vector for the set of candidate objects by computing inner products of respective feature vectors of candidate objects and the target feature vector.

In a further variation on this embodiment, the visual representation of the first subset of candidate objects can include: one or more matching candidate objects; and one or more non-matching candidate objects which are near misses.

In a variation on this embodiment, the system can modify, based on the first user-feedback, the target feature vector and the similarity function by applying, based on the first user-feedback, a target bootstrapping technique to the target feature vector to obtain the modified target feature vector that is consistent with user selected candidate objects from the first subset of candidate objects. The modified target feature vector emphasize features that are similar to the user selected candidate objects and de-emphasize features that are different.

In a further variation on this embodiment, the first subset of candidate objects includes a plurality of candidate objects that is consistent with the first user-feedback.

In a further variation on this embodiment, the first subset of candidate objects includes a plurality of candidate objects that enables the user to expand a scope of the current user's concept of interest.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve a technical problem of determining machine representations for user concepts embodied in unstructured datasets or objects, e.g., video clips, images, and/or text, that can adapt to the dynamically changing user's concept of interest.

Several emerging Artificial Intelligence (AI) technologies facilitate a collaborative learning approach. AI systems can leverage a variety of complementary participants and an improved involvement of the participants can result in an efficient collaborative learning process. The participants can include machine learning programs, humans, and physical subsystems. Each of the participants can have a different role in the collaborative machine learning process. For example, machine learning programs may learn models to inferentially process data streams, mine for interesting patterns, and may also generate explanations for the results. Physical subsystems can sense the environment and capture changing contexts. Human participants may manage high level activities and create demonstrations for teaching to assist in mission development. Further, human participants can provide feedback on the results and can strategically re-organize the machine learning and physical subsystems when necessary.

In one embodiment, two participants are considered for the collaborative learning approach, i.e., a machine learning program and a human with expertise in the concept under investigation. A collaborative learning system can facilitate a learning method that can enable an agile and exploratory collaboration between the participants. In other words, the system can alleviate some of the challenges in machine learning approaches. For example, typical machine learning approaches require an expert to concretely specify upfront a problem being solved. Such an upfront problem specification may limit the ability to conduct exploratory learning which involves improving machine representations of a target concept in collaboration with an evolving user-understanding of the target concept.

Further, typical machine learning approaches often rely on labeled data for training. Such machine learning approaches can be expensive and may pose a burden on the expert. Another challenge with existing machine learning approaches is the inability to provide an understanding of unexplained model behaviors. For example, when an inference model generates an output without some explanation, an expert may not understand why such an output was generated. Due to the scale and complexity of several AI systems, expecting the expert to fill in the understanding gap by observing model behavior for a large set of examples may not be practical. Therefore, in the absence of such an understanding, the application of such AI systems outside a narrow context may be risky.

The embodiments described herein can overcome the above-mentioned challenges encountered in typical AI systems by providing an expert-guided collaborative learning of concepts. For example, a domain expert may aim to study a concept that shows up in a large video data set (other types of dataset can be included, e.g., images and/or text). Since manual review of all the video in the dataset can be impractical, the system can provide a technology that can locate video clips that capture the expert's concept and let the user to evolve the concept in exploratory learning. Specifically, the system can apply novel "learn-evolve-explain" cycles to build a model to capture the expert's concept.

Specifically, a system and method are provided for performing a collaborative learning of machine representations for concepts embodied in unstructured datasets. In other words, the system may receive, from a user, a user-specified object, e.g., a video clip, that embodies a user's concept of interest. The system may apply a search algorithm to search based on a similarity score for machine representations of similar candidate objects stored in a database and that is expected to embody the same concept of interest.

In response to identifying such similar candidate objects, the system presents a visual representation of the similar candidate objects on a graphical user interface (GUI). The user may provide a feedback by validating a subset of the candidate objects that the user thinks embodies the concept of interest and/or a new or evolved concept of interest that the user may have developed after reviewing the similar candidate objects. Based on the user feedback, the system may modify an ensemble of target feature vectors associated with the user-specified object and may also modify a similarity function. The system may determine an updated subset of candidate objects based on the modified ensemble of target feature vectors and the modified similarity function. The system presents a visual representation of the updated subset of candidate objects on the GUI. The user may validate them according to the user's current and possibly evolving concept of interest.

In other words, the user's concept of interest associated with the user-specified object may be initially unclear in the user's mind as the user may be trying to explore different possibilities. As the system continues to iteratively provide the search results to the user, the user may have a better understanding of what concept the user may be interested in the user-specified object. The system iteratively modifies the previously modified ensemble of target feature vectors and the similarity function until the user provides an indication that the search results are tuned or in consensus with the current user's concept of interest. In other words, the system can apply novel "learn-evolve-explain" cycles to build a model to capture the expert's concept.

Therefore, the system facilitates collaborative learning of machine representations of a concept embedded in unstructured datasets and that is capable of emphasizing the user's concept of interest while suppressing additional content. Furthermore, some of the embodiment described herein, can address an emerging technical domain that leverages machine learning for video applications, e.g., in applications such as self-driving vehicles.

The term "video clip" refers to a short section of a video, e.g., a 10 second clip. The terms "video clip" and "clip" are used interchangeably in this disclosure.

The term "signature" refers to a set/ensemble of deep embedded feature vectors that encode clip characteristics.

The term "feature vector" refers to a vector of embedded features for a video clip (or any other data type, e.g., images, text, etc.) computed using a neural network. In general, the "feature vector" is a function of the clip and the neural network.

The term "stream" refers to a deep neural network model that uses video data processed in multiple ways, as part of a collection of streams in a multi-stream architecture.

Exemplary Environment

Figure 1:
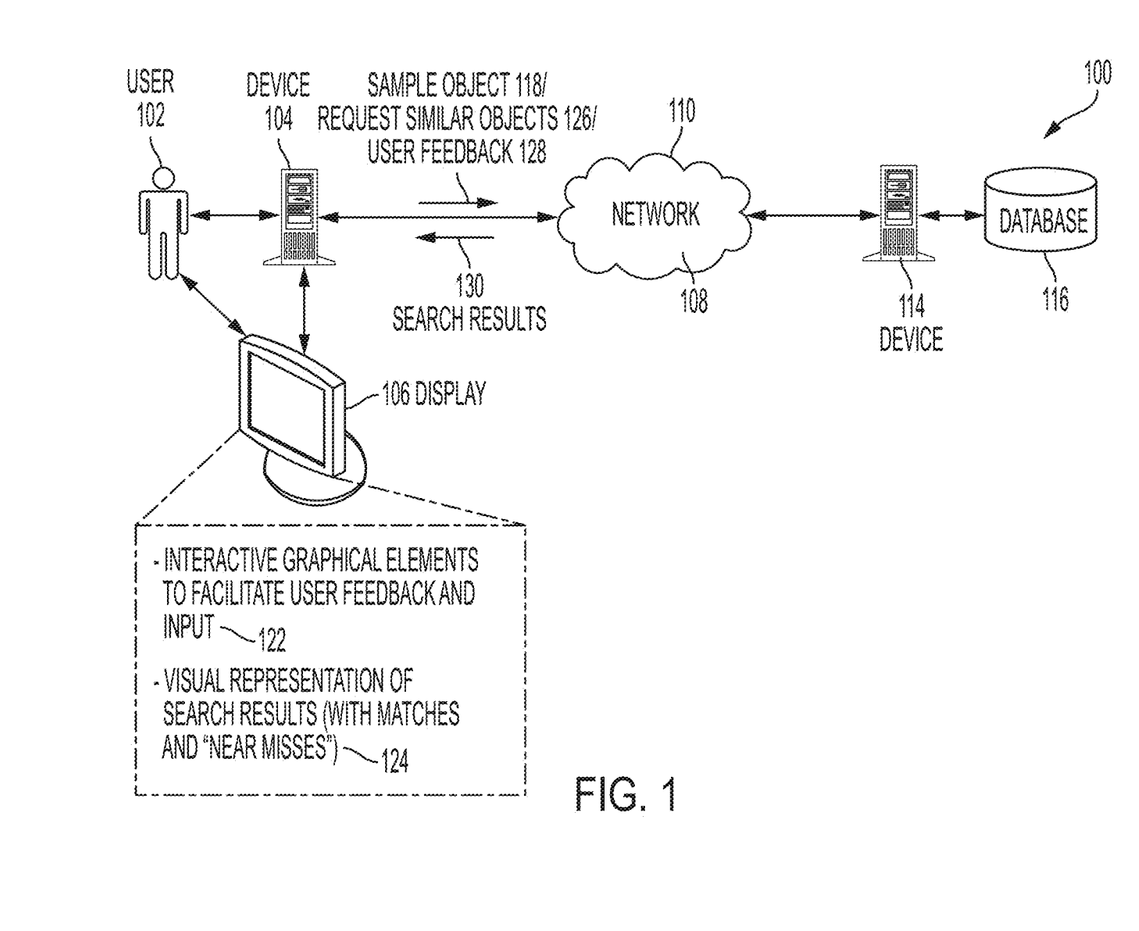
FIG. 1 illustrates an exemplary environment for facilitating collaborative learning of machine representations for a target concept, in accordance with an embodiment of the present application.

FIG. 1 illustrates an exemplary environment for facilitating collaborative learning of machine representations for target concept, in accordance with an embodiment of the present application. In the example shown in FIG. 1, environment 100 can include a device 104 associated with a user 102, a display device 106 coupled to device 104, a device 114, and a database 116 associated with device 114. Device 104 can communicate with device 114 via network 108.

Device 104 may provide on display 106 a GUI which can include interactive graphical elements to facilitate user input and feedback 122. When presented with such a GUI, user 102 may provide an example input video clip or a sample object 118 (other types of inputs can also be provided, e.g., images and/or text) that embodies a user's concept of interest. User 102 may send a request 126 via the GUI to search for similar video clips that embody the user's concept of interest.

Device 104 sends sample object 118 and request for similar objects 126 to device 114 via network 108. Device 114 may compute machine representations of sample object 118. For example, device 114 may compute deep learning target feature vector for sample object 118 and determine, based on a similarity function, similarity scores between target feature vector for sample object 118 and deep learning feature vectors for other objects stored in database 116. Device 114 may identify a subset of objects in database 116 that satisfy a similarity score threshold within a tolerance range and send the identified subset of objects as search results 130 to device 104 via network 108. Device 104 may present a visual representation 124 of search results 130 on the GUI of display 106. Search results 130 may include objects that are annotated as matches and objects that are annotated as "near misses."

User 102 may review the visual representation of search results 124 and provide a feedback 128 based on whether the concept of interest has been embodied in the video clips included in the search results. For example, user 102 may validate and/or de-validate one or more system annotated matching video clips and may validate one or more system annotated non-matching video clips. Device 104 may send user feedback 128 to device 114 via network 108 for further analysis. Device 114 may analyze user feedback 128 and accordingly may modify the target feature vector associated with sample object 118 and update a similarity function. Based on the modified target feature vector and the updated similarity function, device 114 may identify a new subset of candidate objects for review by the user. In this manner, device 114 may iteratively provide matching candidate objects to user 102 based on user feedback 128 until user 102 is satisfied with search results 130, i.e., search results 130 include the current user's concept of interest. Therefore, by performing repeated "learn-and-evolve" cycles of collaborative learning of machine representations, user 102 can figure out a specific concept of interest which was not initially clear in the user's mind.

Exemplary System Architecture

Figure 2:
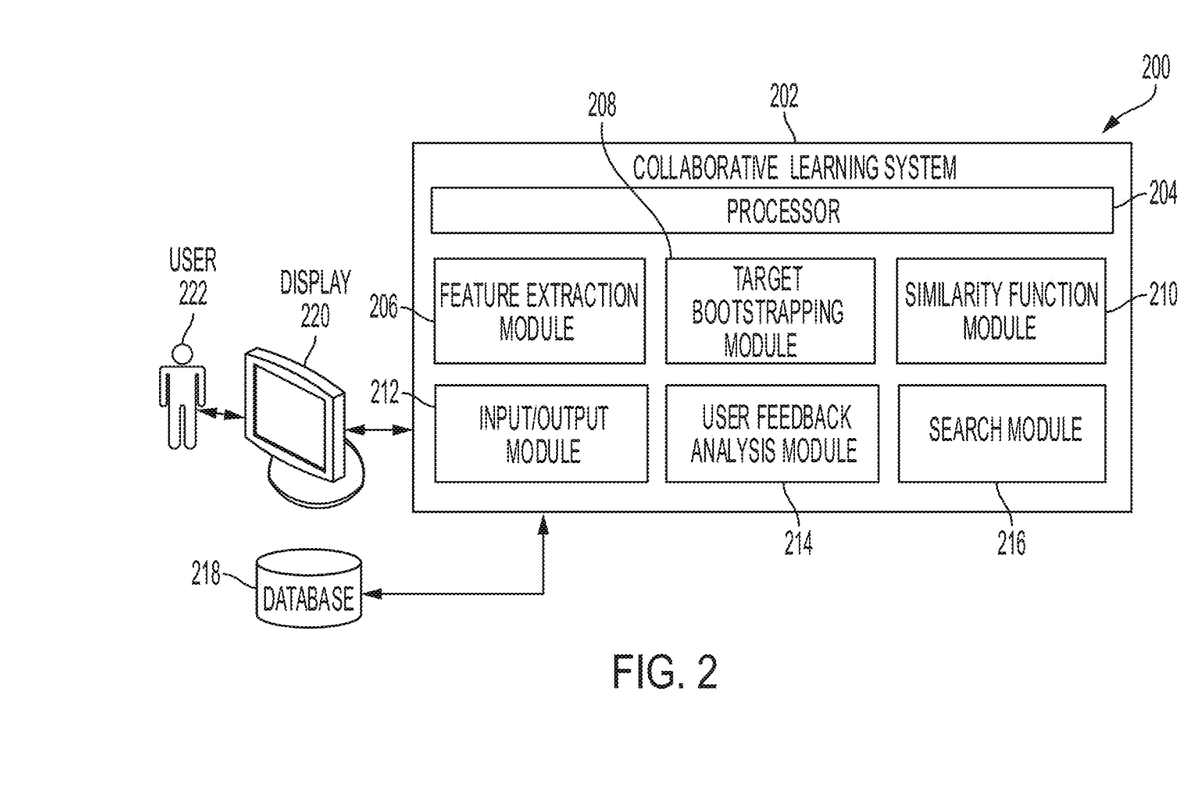
FIG. 2 illustrates an exemplary system architecture for facilitating collaborative learning of machine representations for a target concept, in accordance with an embodiment of the present application.

FIG. 2 illustrates an exemplary system architecture for facilitating collaborative learning of machine representations for a target concept, in accordance with an embodiment of the present application. In the example shown in FIG. 2, system architecture 200 can include a collaborative learning system 202 (hereinafter "system") that can be coupled to a display 220 and a database 218. System 202 can include a processor 204, a feature extraction module 206, a target bootstrapping module 208, a similarity function module 210, an input/output module 212, a user feedback analysis module 214, and a search module 216. Processor 204 can include a microprocessor, a core of a multi-core microprocessor, a microcontroller, a programmable integrated circuit, a programmable gate array, graphics processing units (GPUs) or another hardware processing circuit.

In one embodiment, user 222 may initially provide one or more example video clips or a reference video clip to input/output module 212 via a GUI presented on display 220. The example video clip may be a short section of video, e.g., 10 second clip, and may likely include superfluous activities and objects irrelevant to the scope of the target concept, i.e., the expert's concept, but may nonetheless show some notion of a desired scenario of the concept of interest. User 222 may also select a time in a video that indicates a type of action that user 222 is interested in. In response to receiving the selected time in the video, input/output module 212 may use 10 seconds of video around the selected time as the reference video clip or the user-specified video clip.

System 202 may apply a novel approach to build a weighted ensemble of machine representations for recognizing the intended target concept from among sample video datasets in database 218. Since the example video clip provided by user 222 may include in addition to the user's concept of interest a plurality of other concepts, system 202 may initially not have a refined knowledge of which concept is to be considered when searching for similar video clips.

Prior to performing a search for similar video clips or objects, system 202 may prepare a dataset to be searched. For example, system 202 may apply feature extraction module 206 to divide a video dataset into clips and can compute a signature for each clip based on an ensemble of deep learning neural networks. A video clip signature can represent a set of deep embedded feature vectors that encode clip characteristics. Feature extraction module 206 may apply a neural network to compute vectors of embedded features for a video clip. In general, a feature vector can be represented as a function of the video clip and the neural network. A video clip can be pre-defined to be 10 seconds long. Alternatively, the length parameter associated with a video clip can be varied and system 202 may also take into consideration overlapping of video clips.

Feature extraction module 206 may apply an ensemble model approach for obtaining feature representations of each video clip. The ensemble model can capture more than one property of content in each video clip, e.g., appearance and motion. In one embodiment, feature extraction module 206 may compute an ensemble comprising embeddings computed using models pre-trained on a known video dataset that includes a broad set of human actions. The ensemble under consideration may include embeddings from three red-green-blue (RGB) and three warped optical flow deep nets from Temporal Segment Networks (TSN).

The ensemble of deep learning feature vectors may include three versions of a deep neural network that are pre-trained on three different data splits provided by UCF101 (UCF101 represents a Dataset of 101 Human Actions Classes From Videos in The Wild). There can be a total of six 1024-element embedded feature vectors from six deep neural networks which can correspond to the last feature vectors before the final layers that classify outputs into the UCF101 classes, three of the deep neural networks being RGB networks pre-trained on the three splits of UCF101 data and the other three deep neural networks being warped optical flow deep nets pre-trained on the same three data splits.

The TSN approach can divide a short video into specified number of snippets and can analyze each snippet based on a spatial (RGB) convolution neural network and a temporal (optical flow) neural network. The TSN approach can then apply consensus functions to arrive at a final determination of an action. Optical flow shows the velocity of pixels, and warped optical flow attempts to suppress background motion, e.g., effects of camera rather than actor movement. In one embodiment, feature extraction module 206 can apply warped optical flow neural networks to increase robustness to camera action. Unlike UCF101, some of the use cases can include datasets that address cameras mounted on moving vehicles. Initial test results indicated that warped optical flow could perform better than optical flow alone.

TSN approach emphasizes the analysis of snippets of videos for short actions instead of creating a longer-term memory of an evolving activity, e.g., deducing whether a series of actions in a video corresponds to someone performing an act of shopping before picking up a child. Therefore, system 202 can apply the TSN approach to analyze short action concepts, e.g., identifying a test vehicle stopping for pedestrian crossing in front of the vehicle, "walking with a dog," "band marching," "riding a bike down a path," and "walking across the street."

Feature extraction module 206 may store the computed embedded feature vectors as video clip signatures in a structured database 218, thereby enabling structured queries for comparing signatures.

A deep neural network model with multiple streams has parallel sub-networks that use data processed in multiple ways as input. Feature extraction module 206 may select different stream types. Collaborative learning system 202 can learn ensemble models of features produced by the feature extraction module 206 such that different types of deep neural network embeddings are emphasized or de-emphasized for different types of problems. For example, if there are concepts that correspond to images instead of a video action then an ensemble that emphasizes an image network stream would provide a better solution. For example, if someone is interested in finding all examples of crossing a street at a stop sign versus a stop light, then the differences between a stop light and a stop sign correspond to image differences and not action differences. Users often want to include such "image" features in their search. In another example, different neural networks can be useful in studying facial expressions and head motions. Including neural networks pre-trained on facial expressions instead of actions as in the UCF101 dataset, as tools for computing features in feature extraction module 206 may likely enable better performing ensembles, e.g., for collaborative learning using videos capturing people's faces while driving cars.

In one embodiment, feature extraction module 206 may compute different deep neural network embeddings. Specifically, depending on the concept of interest, integration of embeddings from different layers into an ensemble model can be better than using only the final hidden layer associated with a deep neural network. For example, if a user is looking for basic motions, like veering left versus right, lower layers in a deep neural network may provide a better distinction between such actions. When a TSN is trained with UCF101, the differentiation of left versus right motion may not be present in higher layers of deep neural networks. This is because TSN is be trained to predict correct action regardless of left versus right motion.

In response to user 222 providing an example video clip via display 220, system 202 may apply feature extraction module 206 (already described in previous paragraphs) to extract deep feature representations of the example video clip. System 202 may apply similarity function module 210 to compute similarities between embedded features associated with user provided example video clip and respective embedded features associated with the sample video clips in structured database 218. Specifically, the similarities can be quantified by computing inner products of embedded feature vectors for example video clip(s) and possible matches. The individual inner products can then be combined into an ensemble score.

The similarity function for an embedded feature for a reference video clip (or the user-specified example video clip) and the same embedded feature for a candidate video clip, i, can be denoted as:

$$\frac{f_{DNN}^{(i)T} \cdot f_{DNN}^{ref}}{\|f_{DNN}^{ref}\|_2^2} \quad (1)$$

where f denotes feature vectors, ref denotes the reference clip, T denotes a transpose, and DNN represents a deep neural network (DNN) type, e.g., RGB or warped optical flow. A measure of similarity can represent how close the similarity function in equation (1) is to one. The performance of the similarity function denoted in equation (1) can provide better results in an ensemble model (described in U.S. patent application Ser. No. 16/235,743), whereas the results for a single neural network alone may suffer from significantly high variance.

Equation (1) is different from a cosine similarity. In other words, the denominator is the square of L2 norm of the embedded feature for the reference frame and not the product of norms for both the features. The numerator is the inner product, e.g. the "dot product", of the embedded feature for the reference clip and the embedded feature for a candidate video clip. Similarity function in equation (1) incorporates such a "inner product" to emphasize what is similar along a hyper-dimensional direction of the reference embedding while ignoring what is different in orthogonal hyper-dimensional directions. For example, the two feature vectors, i.e., $f_{DNN}^{(i)T}$ and $f_{DNN}^{ref}$, can be far apart in their hyper-dimensional space, e.g., according to a Euclidean or other distance metric, and may still have a good similarity score.

Since a signature associated with a video clip corresponds to a set of features computed using multiple types of DNN trained on multiple splits of data, hence specifying how the associated similarity metrics are ensembled can be relevant. Specifically, for each type of DNN and for each candidate clip i, similarity function module 210 may compute a similarity measure as:

$$\varphi_{DNN}^{(i)} = \frac{1}{3} \sum_{j=1}^{3} \frac{f_{DNN,j}^{(i)T} \cdot f_{DNN,j}^{ref}}{\|f_{DNN,j}^{ref}\|_2^2} \quad (2)$$

where $f_{DNN,j}^{(i)T}$ denotes the feature for version j of a given DNN type computed for candidate clip i. Different versions of a given DNN type could be versions of the DNN pre-trained on different subsets, or "splits", of a set of training data. In this invention, the training occurs before the DNN's are used in embodiments, such as by performing supervised learning using UCF101 data. Element $f_{DNN,j}^{ref}$ represents a corresponding feature for the reference clip. When candidate clip i is also the reference frame, $\varphi_{DNN}^{(i)}=1$. Also, whenever the projection of $f_{DNN,j}^{(i)}$ on $f_{DNN,j}^{ref}$ equals the squared L2 norm $f_{DNN,j}^{ref}$, the summand equals one even if $f_{DNN,j}^{(i)}$ and $f_{DNN,j}^{ref}$ are not equal, which is a desired behavior of similarity function shown in equation (1).

Further, similarity function module 210 may determine an overall similarity score. Specifically, similarity function module 210 may apply a Euclidean space in which each DNN can correspond to a dimension along which $\varphi_{DNN}^{(i)}$ is measured. In this Euclidean space, a value of $\varphi_{DNN}^{(i)}=1$ for each DNN dimension can be the best possible similarity.

Instead of applying a same weight to each DNN dimension, similarity function module 210 may consider learning optimal weights for each DNN dimension and may compute an overall similarity of clip i to reference clip as $$\theta^i = \frac{\sum_{DNN} w_{DNN}^2 (1 - \varphi_{DNN}^{(i)})^2}{\sum_{DNN} w_{DNN}^2} \quad (3)$$

where $w_{DNN}$ denotes the weights for each type of DNN. Similarity function module 210 may compute similarities $\theta^i$ based on the latest best guess of values $w_{DNN}$ ($w_{RGB}$ and $w_{warped\ optical\ flow}$). In other words, similarity function module 210 may provide different ways or views of looking at the user-specified object. Further, each view or DNN type is weighted differently so that relevant features are emphasized, and other details are either suppressed or ignored.

Search module 216 may determine which clips to present to user 222 for review. Specifically, search module 216 may search and select a small number of clips with similarities (i.e., computed by similarity function module 210) better than a current estimate of a similarity threshold. Better collaborative learning results are often observed when both matches and "near misses" are presented to user 222 for review, thereby enabling user 222 to establish a common understanding by agreeing on positive and negative examples of concepts.

System 202 may apply input/output module 212 to present a visual representation of the selected clips on a GUI via display 220. User 222 may review the results presented on the GUI and provide a feedback. The user feedback can implicitly clarify any ambiguities and uncertainties both for user 222 and system 202 which implements the collaborative machine learning technique. Thus, the user feedback can represent an elaboration of a current user's concept of interest.

User feedback analysis module 214 may analyze the feedback provided by user 222. For example, user feedback analysis module 214 may determine whether the user feedback indicates that the user is satisfied or not with the results. If the user is satisfied, then user feedback analysis module 214 may request system 202 to complete the search process by finding all clips in database 218 that satisfy the latest version of the similarity function in similarity function module 210. Otherwise, user feedback analysis module 214 may request system 202 to continue applying target bootstrapping module 208 and similarity function module 210 to refine the machine representation of the concept. Based on the user feedback, target bootstrapping module 208 may replace $f_{DNN,j}^{ref}$ with a new bootstrapped set $f_{DNN,j}^{b}$ that can be most consistent with user-validated matches, i.e., to capture what is similar with all the matches and ignoring what is different. Target bootstrapping can represent a technique for the machine to learn useful neural network representation of the user's concept of interest, which similarity function module 210 can then learn to combine into a useful ensemble model that outputs a similarity score.

Specifically, target bootstrapping module 208 may determine a set of bootstrapped references $f_{DNN,j}^{b}$ such that equation (1) holds for all user-validated matching clips, i.e., by computing the set of $f_{DNN,j}^{b}$ satisfying the condition in equation (4) (shown below), $$f_{DNN,j}^{(i)T} f_{DNN,j}^{b} - \|f_{DNN,j}^{b}\|_2^2 \quad (4)$$

where equation (4) indicates that for all clips i in the set of user validated matches, all splits j, and all DNN types can correspond to a bootstrapped reference that has $\theta^i=1$. Any bootstrapped set $f_{DNN,j}^b$ may correspond to a hyperplane that is perpendicular to it and contains all the endpoints of $f_{DNN,j}^{(i)}$ for all user-validated matches i. A large number of such hyperplanes may exist, e.g., the dimensions for $f_{DNN,j}^{(i)}$ can be about 1024, which can be higher that the number of user-validated matches.

Target bootstrapping module 208 may initially compute the largest bootstrapped $f_{DNN,j}^b$ (in the L2 norm sense) that satisfies equation (4). Equation (4) may be least restrictive in terms of reducing the impact of any one hyper-dimension on the similarity metric $\theta^i$, thereby not forcing more restrictions on the user's intent than is necessary for inferring a unifying machine representation. To reduce variance, target bootstrapping module 208 may apply "bagging" and select samples with replacement for each bag and average over three bags. A base version of target bootstrapping (implemented in target bootstrapping module 208) is described below with reference to equations (5)-(15).

As already mentioned, selecting a least restrictive bootstrapped $f_{DNN,j}^{ref}$ that can satisfy equation (4) is desirable, since such a selection may not force more restrictions on the user's intent than is justified. Accordingly, obtaining a bootstrapped target for all clips i, that the user has validated to be a match, can be selected as $$\max \frac{1}{2} f^{bT} \cdot f^b \quad (5)$$

such that $$f^{(i)T} f^b = \|f^b\|_2^2. \quad (6)$$

Further, when applying "bagging", the set of all clips i can be replaced by a set that is randomly chosen from the entire set with replacement.

To simplify the maximization problem in equations (5) and (6), a scaled target can be introduced as $$t = \frac{f^b}{\|f^b\|_2^2} \quad (7)$$

Rewriting equations (5) and (6) in terms of the scaled target in equation (7) can result in $$\min \frac{1}{2} t^T \cdot t \quad (8)$$

such that $$f^{(i)T} \cdot t = 1. \quad (9)$$

Equations (8) and (9) can represent a straightforward minimization problem with linear equality constraints. The method of Lagrange multipliers can be applied to obtain a Lagrangian for equations (8) and (9) as $$L = \frac{1}{2} t^T \cdot t + \lambda^T (F \cdot t - 1_J) \quad (10)$$

where $\lambda$ denotes a vector of Lagrange multipliers, $1_J$ denotes a vertical vector of J ones, J represents the number of user-validated matches corresponding to $f^{(i)}$ in equation (9), and F can be denoted as $$F = \begin{bmatrix} \leftarrow f^{(1)T} \rightarrow \\ \leftarrow f^{(2)T} \rightarrow \\ \vdots \\ \leftarrow f^{(J)T} \rightarrow \end{bmatrix}. \quad (11)$$

Minimizing equation (10) with respect to t, i.e., setting $$\frac{\partial L}{\partial t_i} = 0,$$

yields

Since $F \cdot t = 1_J$ (based on equation (9) and $$\frac{\partial L}{\partial \lambda} = 0),$$

the following condition is obtained, i.e., $$1_J + FF^T \cdot \lambda = 0 \quad (13)$$

which implies $$\lambda = -(FF^T)^{-1} \cdot 1_J \quad (14)$$

Substituting back into equation (12), a solution for t can be derived as $$t = F^T \cdot (FF^T)^{-1} \cdot 1_J \quad (15)$$

Since t, the scaled form of $f^b$ given in equation (7), is a quantity applied for the bootstrapped version of equation (1), t need not be converted back to $f^b$.

Target bootstrapping module 208 may provide an extension of the base version of target bootstrapping (illustrated in equation (5)-(15)). For example, in some embodiments, it may be desirable that a bootstrapped target does not deviate a lot from the sample clips that bear some resemblance to the user's intended concept (the sample clips may not correspond to a matching clip). To realize this condition, the target bootstrapping can be modified to incorporate a least square adjustment of "near misses" as $$\min_t \left( \frac{1}{2} t^T \cdot t + \frac{\mu}{tr(YY^T)} \sum_{k=1}^m \frac{1}{2} (y^{(k)T} \cdot t - 1)^2 \right) \quad (16)$$

The vector $y^{(k)}$ denotes a feature for the $k^{th}$ non-matching clip that resembles the user's intended concept. The variable $\mu$ is a hyperparameter that specifies the relative importance of finding a bootstrapped target hyperplane close to the set of features $y^{(k)}$ by minimizing t. Further, Y is denoted as $$Y = \begin{bmatrix} \leftarrow y^{(1)T} \rightarrow \\ \leftarrow y^{(2)T} \rightarrow \\ \vdots \\ \leftarrow y^{(J)T} \rightarrow \end{bmatrix} \quad (17)$$

Solving equation (16) yields $$t = (I - MX)U^{-1}Y^T 1_m \frac{\mu}{tr(YY^T)} + M \cdot 1_J \qquad (18)$$

where $1_m$ and $1_J$ are vertical vectors of m and J ones, respectively, F is denoted as $$F = \begin{bmatrix} \leftarrow f^{(1)T} \rightarrow \\ \leftarrow f^{(2)T} \rightarrow \\ \vdots \\ \leftarrow f^{(m)T} \rightarrow \end{bmatrix}, \text{ and} \qquad (19)$$

$$U = 1 + \frac{\mu}{tr(YY^T)} Y^T Y \qquad (20)$$

$$M = U^{-1} F^T (F U^{-1} F^T)^{-1} \qquad (21)$$

Target bootstrapping module 208 may further perform margin maximization. Specifically, when there are known non-matching clips, adjusting the bootstrapped target hyperplane away from these non-matching clips may be desirable. To include this case, target bootstrapping module 208 may initially compute the bootstrapped target without taking into consideration the non-matching clips. Then for each bootstrapped target vector t, target bootstrapping module 208 may identify a non-matching clip that is closest to the hyperplane for t. Module 208 may adjust t to minimize the expression in equation (22), i.e., $$\frac{1}{2} t^T \cdot t - \mu \gamma \qquad (22)$$

where γ denotes the margin with the nearest non-matching clip, and μ represents a hyperparameter that can be subject to a constraint. This constraint may indicate that the adjustment of t stops when another non-matching clip becomes as close to the adjusted bootstrapped target hyperplane as the nearest non-matching clip.

System 202 may provide the output, i.e., a set of bootstrapped target feature vectors, from target bootstrapping module 208 to similarity function module 210 to update the similarity function based on the new bootstrapped target features. Specifically, similarity function module 210 may compute a new estimate of the weights in equation (3) and a new estimate of the similarity threshold and apply them to determine a set of new similarity scores. Search module 216 may then search and select a new or updated subset of clips with similarity scores better than a current estimate of the similarity threshold. Therefore, system 202 can generate a clip that captures the user's concept of interest, while de-emphasizing comparison with other details in the clip.

System 202 may apply input/output module 212 to provide a visual representation of the recognized intended target concept in the subset of the clips to user 222 via GUI on display 220. User 222 may review the results on the GUI and provide a feedback. The understanding of user's target concept details and nuances may also evolve, and the user may provide a feedback based on the new understanding of the target concept. Therefore, system 202 may perform repeated "learn-evolve-explain" cycles of collaborative learning of machine representations to enable user 222 to figure out a specific concept of interest which was not initially clear in the user's mind.

Figure 3A:
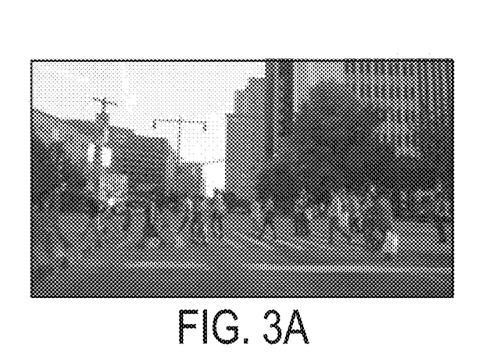
FIG. 3A-3C illustrates three example snapshots of scenarios that a collaborative machine learning system evaluates, in accordance with an embodiment of the present application.
Figure 3B:
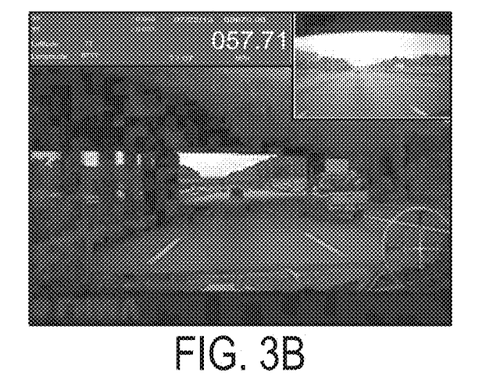
Figure 3C:
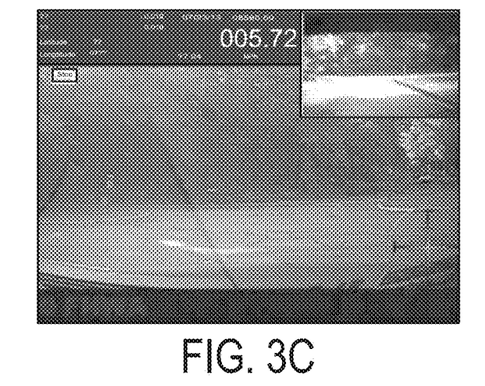

FIG. 3A-3C illustrates three example snapshots of scenarios that a collaborative machine learning system evaluates, in accordance with an embodiment of the present application. The example snapshot shown in FIGS. 3A-3B represent different scenarios captured using videos from moving vehicles. For example, FIG. 3A can represent a video clip of vehicles interacting with pedestrians at intersections. FIG. 3B can represent a video clip of vehicles driving underneath an overpass, and FIG. 3C can represent a video clip of vehicles taking a noticeable left turn. Different users may discern different concepts of interest in each of these scenarios shown in FIGS. 3A-3C. Some of the embodiment described herein, can address an emerging technical domain that leverages machine learning for video applications, e.g., in applications such as self-driving vehicles.

Figure 4:
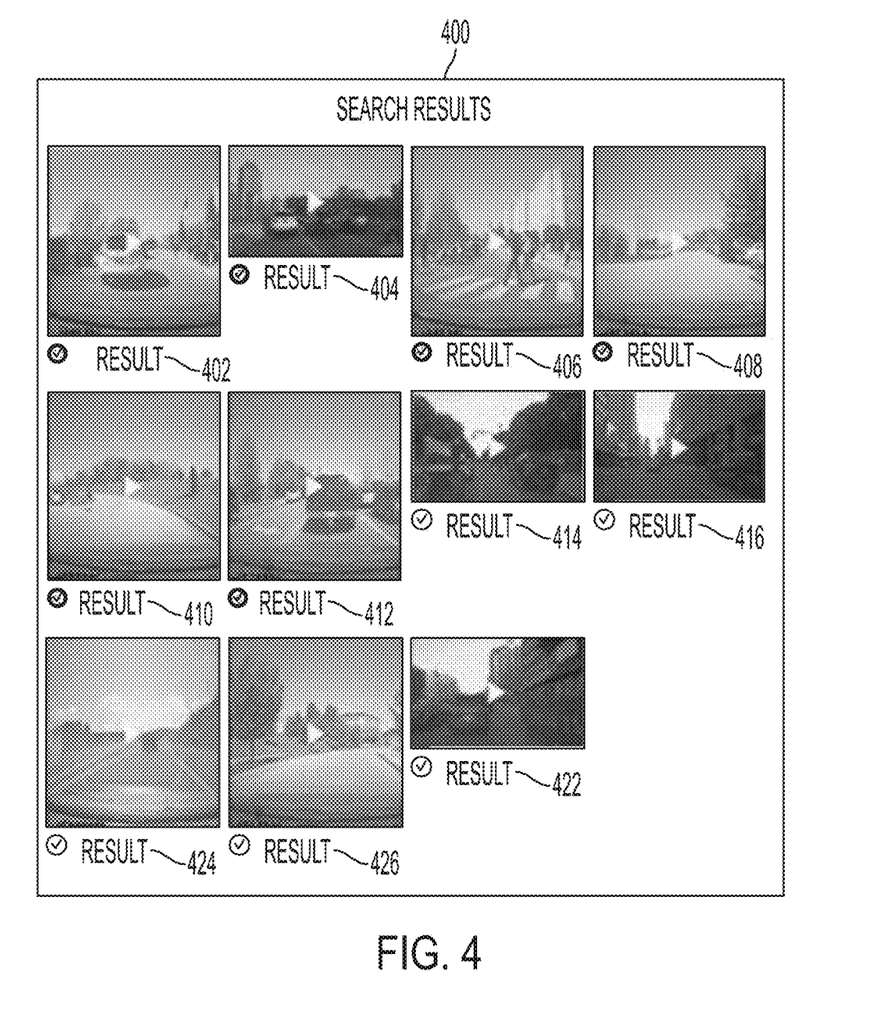
FIG. 4 illustrates an exemplary visual representation of search results associated with a collaborative machine learning system, in accordance with an embodiment of the present application.

FIG. 4 illustrates an exemplary visual representation of search results associated with a collaborative machine learning system, in accordance with an embodiment of the present application. In the example shown in FIG. 4, the user may have provided a target video clip representing the scenario in FIG. 3A, i.e., corresponding to vehicles interacting with pedestrians at intersections. In one embodiment, the system may provide specific search results 400 that include similar scenarios to motivate the user to focus on a particular concept, thereby facilitating an analysis of a well-defined hypothesis in a manner that is consistent with the user's concept of interest. Specifically, search results 400 may include matching clips (results 402-412 are identified with a tick mark inside a bold black circle) and non-matching clips or "near misses", i.e., results 414-426 are annotated with a tick mark inside a grey circle.

The user may review the search results and validate the search results by either validating one or more non-matching clips as matching clips, i.e., annotating the non-matching clips to indicate their selection on the GUI. In other words, if the user finds that the scenario indicated by a non-matching clip, e.g., result 416, may be of interest and the user may want to further explore similar scenarios related to that depicted in result 416, then the user may select result 416. Similarly, the user may invalidate a matching clip as a non-matching clip if the user does not want to further explore similar scenarios shown in the matching clip. Further, the system may provide search results 400 that can motivate the user to expand the scope of interest and perform curiosity-driven data exploration instead of focusing on a narrow concept.

Figure 5A:
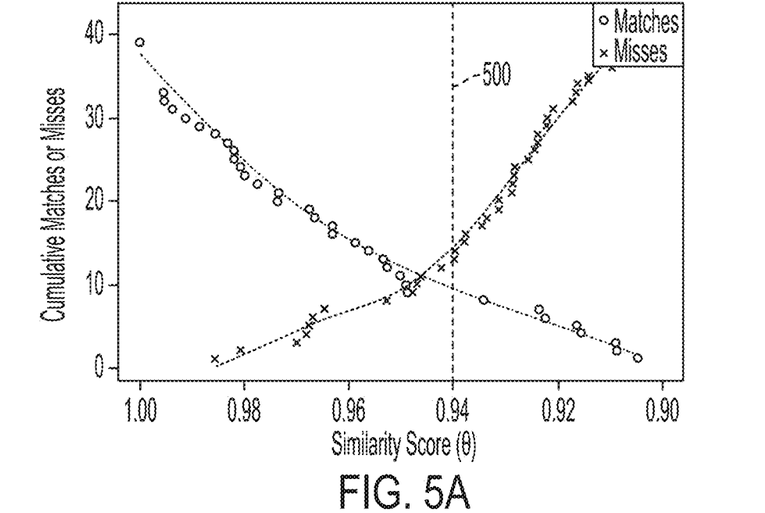
FIG. 5A-5B illustrates exemplary experimental results for queries associated with vehicles interacting with pedestrians crossing a street, in accordance with an embodiment of the present application.
Figure 5B:
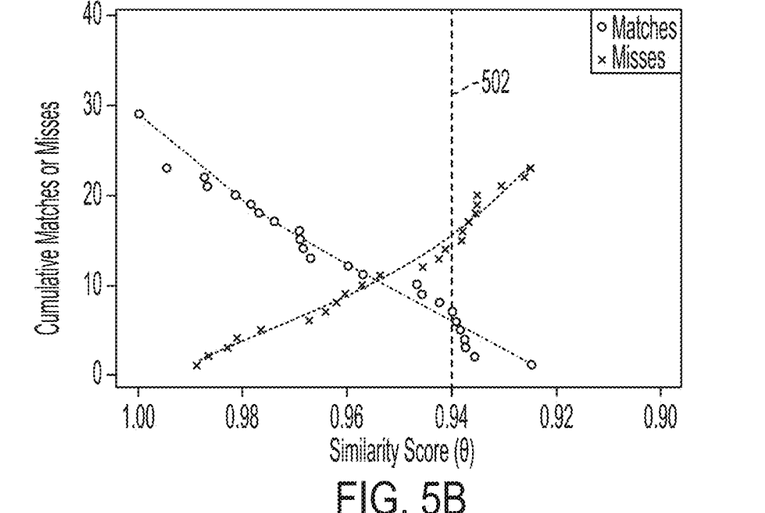

FIG. 5A-5B illustrates exemplary experimental results for queries associated with vehicles interacting with pedestrians crossing a street, in accordance with an embodiment of the present application. In the experimental results shown in FIGS. 5A-5B, the y-axis represents cumulative matches (indicated with circles) or misses (indicated with crosses) for pedestrian crossing street scenario, the x-axis represents a similarity score (θ). As the similarity score decreases, the distribution of matches declines while the one for misses grows. The vertical line 500 and 502 indicate learned thresholds separating predicted matches and misses.

The experimental results shown in FIG. 5A represents a case where a first type of user accepted any search result clip in which the vehicle interacted with a pedestrian or the vehicle was stopped for a pedestrian as a valid match. As indicated in FIG. 5A, 80% of the matches are correctly located above a learned threshold, i.e., indicated by vertical line 500, and 22.5% of the clips above this threshold are false positives, i.e., the curve with cross marks. The experimental results shown in FIG. 5B represents a case where a second type of user validated clips in which both the vehicle and the pedestrian are moving, and the user rejected clips in which the vehicle remained stationary or in a stop state. FIG. 5B illustrates that 79% of the matches are correctly located above learned threshold, i.e., indicated by vertical line 502, while the false positive fraction is at 38%.

One embodiment may analyze the diverging sample distributions in the embedded feature space and may facilitate the human-machine collaborative learning system to discern when the user's interest is broadening or conflicted and may handle multiple concepts separately.

Figure 6:
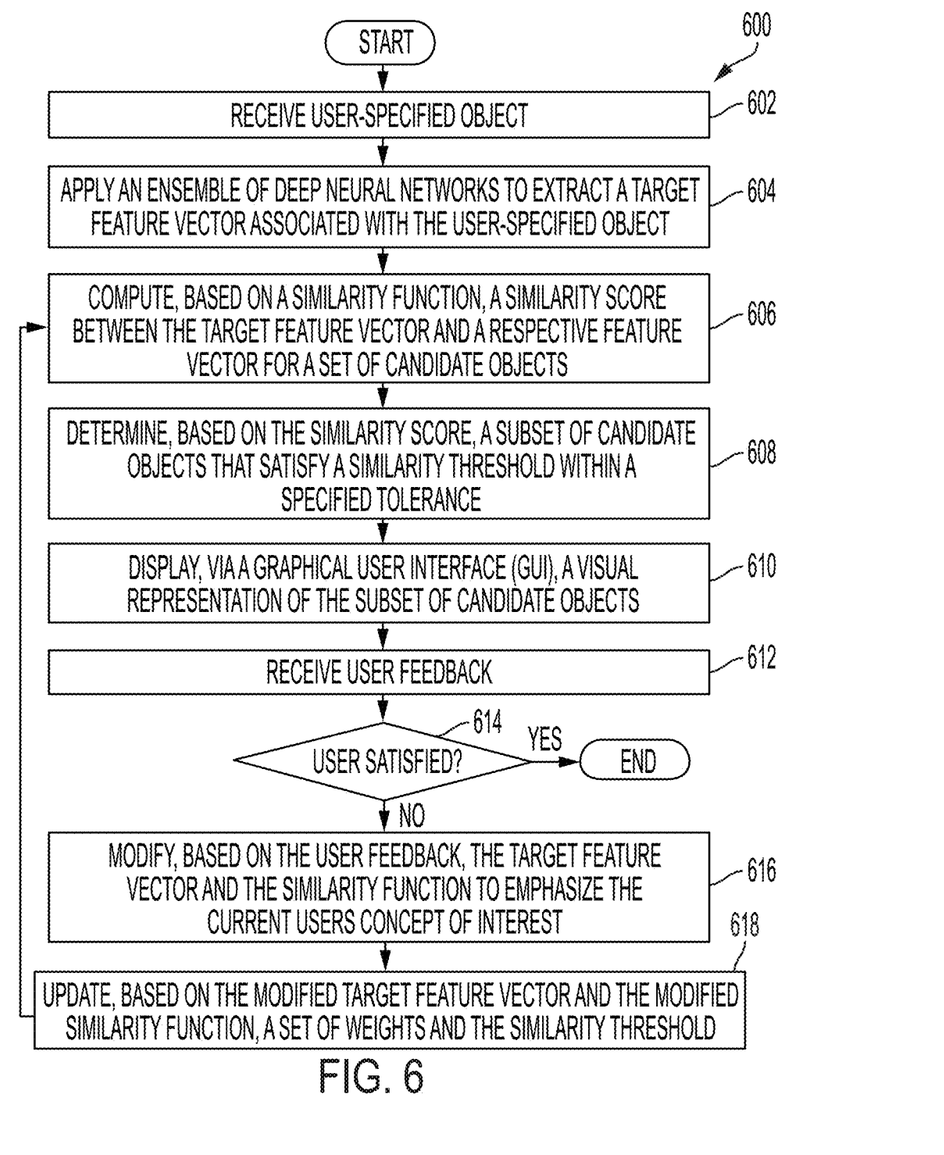
FIG. 6 presents a flow chart illustrating a method for performing collaborative learning of machine representations for a concept embodied in unstructured datasets, in accordance with an embodiment of the present application.

FIG. 6 presents a flow chart illustrating a method for performing collaborative learning of machine representations for a concept embodied in unstructured datasets, in accordance with an embodiment of the present application. During operation, the system may receive a user-specified object including a user's concept of interest (operation 602). The user-specified object can correspond to a video clip, image, or text. The system can then apply an ensemble of pre-trained deep neural networks, e.g., pre-trained on action recognition, to extract deep feature representations, i.e., a target feature vector, of the user-specified object (operation 604). The system may then apply a novel collaborative machine learning technique to collaboratively evolve and clarify the user's concept of interest. Specifically, the system may compute, based on a similarity function, a similarity score between the target feature vector and a respective feature vector for a set of candidate objects (operation 606). Prior to computing the similarity scores, the system computes deep learning feature vectors corresponding to the set of candidate objects. These deep learning feature vectors are stored in a structured database.

A similarity score can indicate a measure of similarity between the target feature vector and a respective feature vector for a candidate object with reference to a similarity threshold. In response to determining a plurality of similarity scores, the system may determine which of the similarity scores satisfy a similarity threshold within a certain tolerance limit (operation 608). In other words, the system may select a subset of candidate objects whose associated similarity scores satisfy the similarity threshold within a tolerance limit. The subset of candidate objects may represent video clips (or any other data type, e.g., images and text) that are matching with the machine's understanding of the user's concept of interest in the user-specified object. In one embodiment, the system may also include video clips that are "near misses", e.g., candidate objects or video clips which the system considers to be outside the scope of the target concept or user's concept of interest. By selecting such non-matching video clips, the system may motivate the user to expand the scope of interest and perform curiosity-driven data exploration instead of focusing on a particular concept.

The system may present a visual representation of the subset of candidate objects in a GUI via a display device (operation 610). The system may annotate some of the candidate objects as matching clips, e.g., with a green tick mark, and may annotate the remaining candidate objects as non-matching clips or "near misses", e.g., with a grey tick mark. The user may review the search results, i.e., the visual representation of the subset of candidate objects, and provide a feedback (operation 612). For example, the user may agree with the system's selection of candidate objects as matching and/or non-matching clips. The user may also disagree with the search results and provide a feedback accordingly, e.g., the user may annotate a non-matching clip to indicate that the user is interested in exploring concepts in a specific non-matching clip or the user thinks that the user's concept of interest is embodied in the non-matching clip. Further the user may reject or annotate a matching clip to indicate that the concept embodied in the matching clip is inconsistent with the user's concept of interest or the user is no more interested in exploring a concept embodied in the matching clip. In this manner the user implicitly clarifies ambiguities both for the system and for the user as well.

In response to receiving the user feedback, the system may determine whether the user is satisfied with the search results (operation 614). When the system determines that the user is not satisfied, the system may modify, based on the user feedback, the target feature vector (by applying a target bootstrapping technique) and the similarity function to emphasize the current user's concept of interest (that has been implicitly clarified in the user feedback) (operation 616). The system may further update, based on the modified target feature vector and the modified similarity function, a set of weights and the similarity threshold (operation 618). In other words, given the user feedback, the system may refine the machine representation of the current user's concept of interest and refine the search for matching clips that captures only the current user's concept of interest while de-emphasizing other details.

Based on the results of operation 618, the system may perform another "learn-evolve-explain" cycle until the user is satisfied, i.e., after operation 618 the system may continue to operation 606. After a certain number (i.e., until the user is satisfied) of repetitive "learn-evolve-explain" cycles, the system may generate a video clip that focuses on the current user's concept of interest while suppressing and minimizing additional content. In each "learn-evolve-explain" cycle, the user may accept the explanatory video clip or may engage in further "learn-evolve-explain" cycles. In each "learn-evolve-explain" cycle, the system can create a human-understandable representation that can explain the internal model representation of the user's concept of interest. In other words, the system and the user jointly discern the target concept (or the user's concept of interest) starting with a user-specified example video clip, without a concrete problem specification up front. The system's learning of the user's concept of interest evolves based on user-guided ongoing collaborative approach. When the user is satisfied with the search results (operation 614) then system completes the learn-evolve-explain cycle.

Exemplary Computer System

Figure 7:
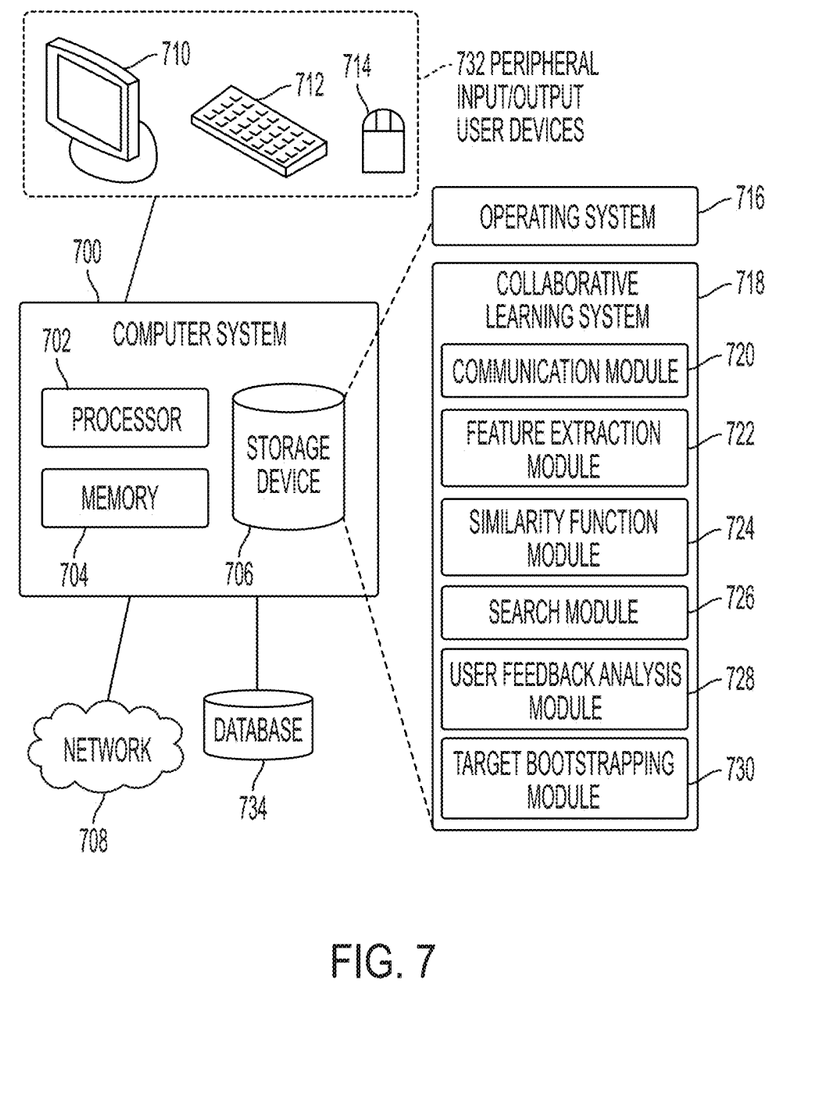
FIG. 7 illustrates an exemplary distributed computer and communication system that facilitates collaborative learning of machine representations for a concept embodied in unstructured datasets, in accordance with an embodiment of the present application.

FIG. 7 illustrates an exemplary distributed computer and communication system that facilitates collaborative learning of machine representations for a concept embodied in unstructured datasets, in accordance with an embodiment of the present application. In this example, computer system 700 can include a processor 702, a memory 704, and a storage device 706. Computer system 700 can be coupled to peripheral input/output (I/O) user devices 732, e.g., a display device 710, a keyboard 712, and a pointing device 714, and can also be coupled via one or more network interfaces to a network 708. Storage device 706 can store instructions for an operating system 716 and a collaborative learning system 718.

In one embodiment, collaborative learning system 718 can include instructions, which when executed by processor 702 can cause computer system 700 to perform methods and/or processes described in this disclosure. Collaborative learning system 718 can include a communication module 720 to receive user-specified objects and user feedback via display device 710. Collaborative learning system 718 can further include instructions implementing a feature extraction module 722 for extracting deep learning feature representations of a user-specified object. In addition, feature extraction module 722 can extract deep learning feature vectors of a set of candidate objects and store them in a structured database 734 coupled to computer system 700.

Collaborative learning system 718 can include a similarity function module 724 which can apply a similarity function to determine a set of similarity scores, with each similarity score indicating a measure of similarity between a target feature vector associated with the user-specified object and a respective feature vector of a candidate object. Further, similarity function module 724 can learn weights for each DNN type associated with a video clip and then compute an overall similarity of a certain candidate object with the user-specified object by computing a weighted average over all the DNN types. Collaborative learning system 718 can also include a search module 726 that can search for candidate objects for which the associated similarity score satisfies a similarity threshold within a tolerance limit. Collaborative learning system 718 may apply communication module 720 to provide a visual representation of the search results on a GUI via display device 710.

Communication module 720 can further include instructions to receive user feedback from a user via display device 710. In response to receiving the user feedback, user feedback analysis module 728 analyzes the user-feedback to determine whether the user is satisfied with the search results. In response to determining that the user is not satisfied, collaborative learning system 718 may apply target bootstrapping module 730 to modify the target feature vector based on the user feedback. Further, collaborative learning system 718 may apply similarity function module 724 to update a set of weights and the similarity threshold based on the user feedback and the modified target feature vector. Collaborative learning system 718 may continue to repetitively apply modules 720-730 until the user is satisfied with the search results. In other words, collaborative learning system 718 can perform "learn-evolve-explain" cycles and after a certain number of such cycles the system generates a video clip that focuses on the user's concept of interest while suppressing and minimizing other details.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving a user-specified object associated with a user's concept of interest;
computing, based on a similarity function, a similarity score between a target feature vector associated with the user-specified object and a respective feature vector for a set of candidate objects;
determining, based on the similarity score, a first subset of candidate objects that satisfy a similarity threshold within a specified tolerance;
presenting, via a graphical user interface (GUI), a visual representation of the first subset of candidate objects;
receiving a first user-feedback corresponding to the visual representation of the first subset of candidate objects, wherein the first user-feedback represents an elaboration of a current user's concept of interest; and
modifying, based on the first user-feedback, the target feature vector and the similarity function, thereby providing an improved model for machine representations of the current user's concept of interest; and
wherein computing the similarity score comprises computing, based on multiple types of deep neural networks (DNN) associated with each candidate object and user-specified object, a weighted ensemble average of similarities, wherein each type of DNN is associated with a different weight, wherein a respective weight is updated based on a user feedback.

2. The computer-implemented method of claim 1, wherein the user-specified object represents one or more of:
a video clip;
an image;
text; and
others types of objects for which deep neural network embedded features exist.

3. The computer-implemented method of claim 1, wherein the first user-feedback includes:
a selection of one or more non-matching candidate objects in the first subset of candidate objects; and
a de-selection of one or more matching candidate objects in the first subset of candidate objects.

4. The computer-implemented method of claim 1, further comprising:
iteratively performing following operations until a user request to terminate searching for matching candidate objects is received:
computing, based on the modified similarity function and the modified target feature vector, an updated similarity score between the modified target feature vector and a respective feature vector for the set of candidate objects;

determining, based on the updated similarity score, a second subset of candidate objects that satisfy an updated similarity threshold within the specified tolerance;

receiving a second user-feedback corresponding to a visual representation of the second subset of candidate objects, wherein the second user-feedback indicates a current user's concept of interest; and modifying, based on the second user-feedback, the modified target feature vector and the modified similarity function, thereby further improving the model for machine representations of the current user's concept of interest in collaboration with the user.

5. The computer-implemented method of claim 1, wherein computing, based on the similarity function, the similarity score between the target feature vector associated with the user-specified object and the respective feature vector for a set of candidate objects comprises:
computing inner products of respective feature vectors of candidate objects and the target feature vector.

6. The computer-implemented method of claim 1, wherein the visual representation of the first subset of candidate objects includes:
one or more matching candidate objects; and
one or more non-matching candidate objects which are near misses.

7. The computer-implemented method of claim 1, wherein modifying, based on the first user-feedback, the target feature vector and the similarity function comprises:
applying, based on the first user-feedback, a target bootstrapping technique to the target feature vector to obtain the modified target feature vector that is consistent with user selected candidate objects from the first subset of candidate objects, wherein the modified target feature vector emphasizes features that are similar to the user selected candidate objects and de-emphasizes features that are different.

8. The computer-implemented method of claim 1, wherein the first subset of candidate objects includes a plurality of candidate objects that is consistent with the first user-feedback.

9. The computer-implemented method of claim 1, wherein the first subset of candidate objects includes a plurality of candidate objects that enables the user to expand a scope of the current user's concept of interest.

10. A computer system, comprising:
a processor; and
a storage device coupled to the processor and storing instructions which when executed by the processor cause the processor to perform a method, the method comprising:
receiving a user-specified object associated with a user's concept of interest;
computing, based on a similarity function, a similarity score between a target feature vector associated with the user-specified object and a respective feature vector for a set of candidate objects;
determining, based on the similarity score, a first subset of candidate objects that satisfy a similarity threshold within a specified tolerance;
presenting, via a graphical user interface (GUI), a visual representation of the first subset of candidate objects;
receiving a first user-feedback corresponding to the visual representation of the first subset of candidate objects, wherein the first user-feedback represents an elaboration of a current user's concept of interest; and
modifying, based on the first user-feedback, the target feature vector and the similarity function, thereby providing an improved model for machine representations of the current user's concept of interest; and
wherein computing the similarity score comprises computing, based on multiple types of deep neural networks (DNN) associated with each candidate object and user-specified object, a weighted ensemble average of similarities, wherein each type of DNN is associated with a different weight, wherein a respective weight is updated based on a user feedback.

11. The computer system of claim 10, wherein the user-specified object represents one or more of:
a video clip;
an image;
text; and
others types of objects for which deep neural network embedded features exist.

12. The computer system of claim 10, wherein the first user-feedback includes:
a selection of one or more non-matching candidate objects in the first subset of candidate objects; and
a de-selection of one or more matching candidate objects in the first subset of candidate objects.

13. The computer system of claim 10, the method further comprising:
iteratively performing following operations until a user request to terminate searching for matching candidate objects is received:
computing, based on the modified similarity function and the modified target feature vector, an updated similarity score between the modified target feature vector and a respective feature vector for the set of candidate objects;
determining, based on the updated similarity score, a second subset of candidate objects that satisfy an updated similarity threshold within the specified tolerance;
receiving, from the user, a second user-feedback associated with a visual representation of the second subset of candidate objects, wherein the second user-feedback indicates a current user's concept of interest; and
modifying, based on the second user-feedback, the modified target feature vector and the modified similarity function, thereby further improving the model for machine representations of the current user's concept of interest in collaboration with the user.

14. The computer system of claim 10, wherein computing, based on the similarity function, the similarity score between the target feature vector associated with the user-specified object and the respective feature vector for a set of candidate objects comprises:
computing inner products of respective feature vectors of candidate objects and the target feature vector.

15. The computer system of claim 10, wherein the visual representation of the first subset of candidate objects includes:
one or more matching candidate objects; and
one or more non-matching candidate objects which are near misses.

16. The computer system of claim 10, wherein modifying, based on the first user-feedback, the target feature vector and the similarity function comprises:

applying, based on the first user-feedback, a target bootstrapping technique to the target feature vector to obtain the modified target feature vector that is consistent with user selected candidate objects from the first subset of candidate objects, wherein the modified target feature vector emphasizes features that are similar to the user selected candidate objects and de-emphasizes features that are different.

17. The computer system of claim 10, wherein the first subset of candidate objects includes a plurality of candidate objects that is consistent with the first user-feedback.

18. The computer system of claim 10, wherein the first subset of candidate objects includes a plurality of candidate objects that enables the user to expand a scope of the current user's concept of interest.

19. A non-transitory computer-readable storage medium storing instructions to:
  receive a user-specified object associated with a user's concept of interest;
  compute, based on a similarity function, a similarity score between a target feature vector associated with the user-specified object and a respective feature vector for a set of candidate objects;
  determine, based on the similarity score, a first subset of candidate objects that satisfy a similarity threshold within a specified tolerance;
  present, via a graphical user interface (GUI), a visual representation of the first subset of candidate objects;
  receive a first user-feedback corresponding to the visual representation of the first subset of candidate objects, wherein the first user-feedback represents an elaboration of a current user's concept of interest; and
  modify, based on the first user-feedback, the target feature vector and the similarity function, thereby providing an improved model for machine representations of the current user's concept of interest; and
  wherein computing the similarity score comprises computing, based on multiple types of deep neural networks (DNN) associated with each candidate object and user-specified object, a weighted ensemble average of similarities, wherein each type of DNN is associated with a different weight, wherein a respective weight is updated based on a user feedback.

20. The non-transitory computer-readable storage medium of claim 19, wherein the instructions are further to compute the similarity score by computing inner products of respective feature vectors of candidate objects and the target feature vector.

* * * * *